United States Patent
Amon et al.

(10) Patent No.: US 10,997,450 B2
(45) Date of Patent: May 4, 2021

(54) METHOD AND APPARATUS FOR DETECTING OBJECTS OF INTEREST IN IMAGES

(71) Applicant: SIEMENS AKTIENGESELLSCHAFT, Munich (DE)

(72) Inventors: Peter Amon, Munich (DE); Sanjukta Ghosh, Schwaig bei Nürnberg (DE); Andreas Hutter, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 95 days.

(21) Appl. No.: 16/482,180

(22) PCT Filed: Nov. 7, 2017

(86) PCT No.: PCT/EP2017/078429
§ 371 (c)(1),
(2) Date: Jul. 30, 2019

(87) PCT Pub. No.: WO2018/141429
PCT Pub. Date: Aug. 9, 2018

(65) Prior Publication Data
US 2020/0057904 A1    Feb. 20, 2020

(30) Foreign Application Priority Data
Feb. 3, 2017   (IN) .............................. 201711004037

(51) Int. Cl.
*G06K 9/32*   (2006.01)
*G06K 9/62*   (2006.01)
*G06N 3/08*   (2006.01)

(52) U.S. Cl.
CPC ......... *G06K 9/3241* (2013.01); *G06K 9/6256* (2013.01); *G06N 3/08* (2013.01)

(58) Field of Classification Search
CPC .. G06K 9/3241; G06K 9/6256; G06K 9/4628; G06K 9/38; G06K 9/6262;
(Continued)

(56) References Cited

U.S. PATENT DOCUMENTS 8,909,561 B2 * 12/2014 Furukawa ............... G06N 20/10
706/12
9,008,365 B2 * 4/2015 Xu ....................... G06K 9/4642
382/103
(Continued)

OTHER PUBLICATIONS

"Reliable pedestrian detection using a deep neural network trained on pedestrian counts"; Sanjukta Ghosh, 2017 IEEE International Conference on Image Processing (ICIP) (pp. 685-689) (Year: 2017).*
(Continued)

*Primary Examiner* — Michael S Osinski
(74) *Attorney, Agent, or Firm* — Lempia Summerfield Katz LLC

(57) ABSTRACT

A method and apparatus for detecting objects of interest in images, the method comprising the steps of supplying (S1) at least one input image to a trained deep neural network, DNN, which comprises a stack of layers; and using at least one deconvolved output of at least one learned filter or combining (S2) deconvolved outputs of learned filters of at least one layer of the trained deep neural network, DNN, to detect the objects of interest in the supplied images.

20 Claims, 3 Drawing Sheets

(58) Field of Classification Search
CPC ........... G06K 9/00369; G06K 9/00771; G06K 9/6232; G06K 9/627; G06K 9/66; G06K 9/00778; G06K 9/00624; G06K 9/6267; G06N 3/08; G06N 3/0454; G06N 3/04; G06N 3/084; G06N 3/02; G06N 3/0445; G06N 20/00; G06N 20/10; G06T 2207/20081; G06T 2207/20084; G06T 2207/20016; G06T 2207/20021; G06T 7/11

See application file for complete search history.

(56) References Cited

U.S. PATENT DOCUMENTS

| | | | | |
|---|---|---|---|---|
| 9,251,425 | B2* | 2/2016 | Datta | G06K 9/00718 |
| 9,443,314 | B1* | 9/2016 | Huang | G06K 9/00684 |
| 9,633,268 | B1* | 4/2017 | Ma | G06K 9/00342 |
| 9,633,282 | B2* | 4/2017 | Sharma | G06K 9/66 |
| 9,947,103 | B1* | 4/2018 | Kim | G06T 7/194 |
| 10,410,090 | B1* | 9/2019 | Wilczynski | G06K 9/4604 |
| 10,733,876 | B2* | 8/2020 | Moura | G06K 9/00785 |
| 10,827,938 | B2* | 11/2020 | Fontanarava | G16H 30/40 |
| 10,832,092 | B2* | 11/2020 | Shaubi | G06K 9/6256 |
| 2013/0058566 | A1* | 3/2013 | Sato | G06K 9/4642 382/159 |
| 2015/0278710 | A1* | 10/2015 | Hisada | G06N 20/00 706/12 |
| 2016/0132755 | A1* | 5/2016 | Ikeda | G06N 20/00 382/159 |
| 2017/0061625 | A1* | 3/2017 | Estrada | G06N 3/0454 |
| 2017/0083752 | A1* | 3/2017 | Saberian | G06N 3/0454 |
| 2017/0323202 | A1* | 11/2017 | Wang | G06N 3/08 |
| 2017/0371403 | A1* | 12/2017 | Wetzler | G06K 9/00355 |
| 2018/0005047 | A1* | 1/2018 | Yu | G06N 3/0445 |
| 2018/0060653 | A1* | 3/2018 | Zhang | G11B 27/031 |
| 2018/0150956 | A1* | 5/2018 | Kao | G06K 9/4628 |
| 2018/0225820 | A1* | 8/2018 | Liang | G06K 9/627 |
| 2018/0253627 | A1* | 9/2018 | Baradel | G06K 9/6262 |
| 2019/0043172 | A1* | 2/2019 | Chui | G06K 9/00201 |
| 2019/0251471 | A1* | 8/2019 | Morita | G06F 16/583 |
| 2019/0355128 | A1* | 11/2019 | Grauman | G06K 9/00765 |
| 2020/0005942 | A1* | 1/2020 | Kawagishi | G16H 30/40 |
| 2020/0090005 | A1* | 3/2020 | Ghosh | G06K 9/6262 |
| 2020/0110971 | A1* | 4/2020 | Csillag | G06K 9/00248 |
| 2020/0167930 | A1* | 5/2020 | Wang | G06T 7/0012 |
| 2020/0242777 | A1* | 7/2020 | Jiang | G06T 7/136 |
| 2020/0272902 | A1* | 8/2020 | Feng | G06K 9/4628 |
| 2020/0285869 | A1* | 9/2020 | Mansour | G06N 3/0454 |
| 2020/0303072 | A1* | 9/2020 | Drokin | G06N 20/00 |
| 2020/0380659 | A1* | 12/2020 | Lin | G06T 7/0002 |
| 2020/0389658 | A1* | 12/2020 | Kim | H04N 19/154 |

OTHER PUBLICATIONS

"Learning a perspective-embedded deconvolution network for crowd counting"; Muming Zhao, 2017 IEEE International Conference on Multimedia and Expo (ICME) (pp. 403-408) (Year: 2017).*

"Learning Deconvolution Network for Semantic Segmentation"; Hyeonwoo Noh, 2015 IEEE International Conference on Computer Vision (ICCV) (pp. 1520-1528) (Year: 2015).*

Chakraborty, Satyaki, Daniel Maturana, and Sebastian Scherer. "Detecting cars in aerial photographs with a hierarchy of deconvolution nets." Technical Report CMU-RI-TR-16-60, Robotics Institute, Carnegie Mellon University,Nov. 2016. pp. 1-6.

Fu, Cheng-Yang, et al. "DSSD: Deconvolutional single shot detector." arXiv preprint arXiv:1701.06659. Jan. 23, 2017. pp. 1-11.

Li, Hongyang, et al. "Zoom out-and-in network with recursive training for object proposal." arXiv preprint arXiv:1702.05711. Feb. 19, 2017. pp. 1-9.

Noh, Hyeonwoo, Seunghoon Hong, and Bohyung Han. "Learning deconvolution network for semantic segmentation." Proceedings of the IEEE international conference on computer vision. May 17, 2015. pp. 1-10.

PCT International Search Report and Written Opinion of International Searching Authority, corresponding to PCT International Application No. PCT/EP2017/078429 filed Nov. 7, 2017.

* cited by examiner

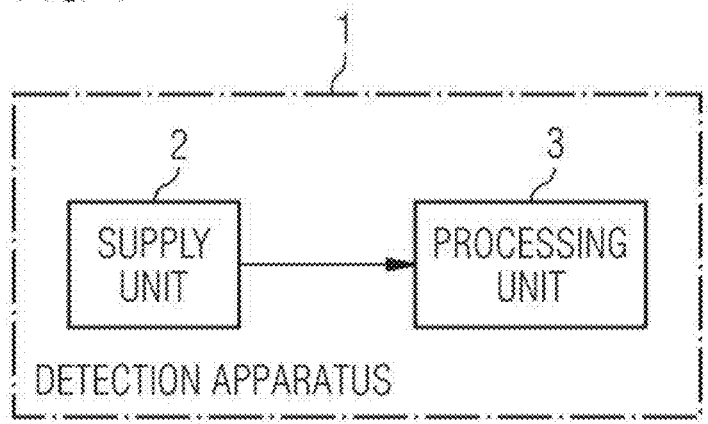
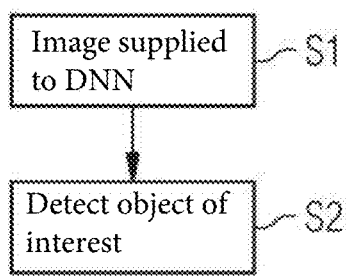

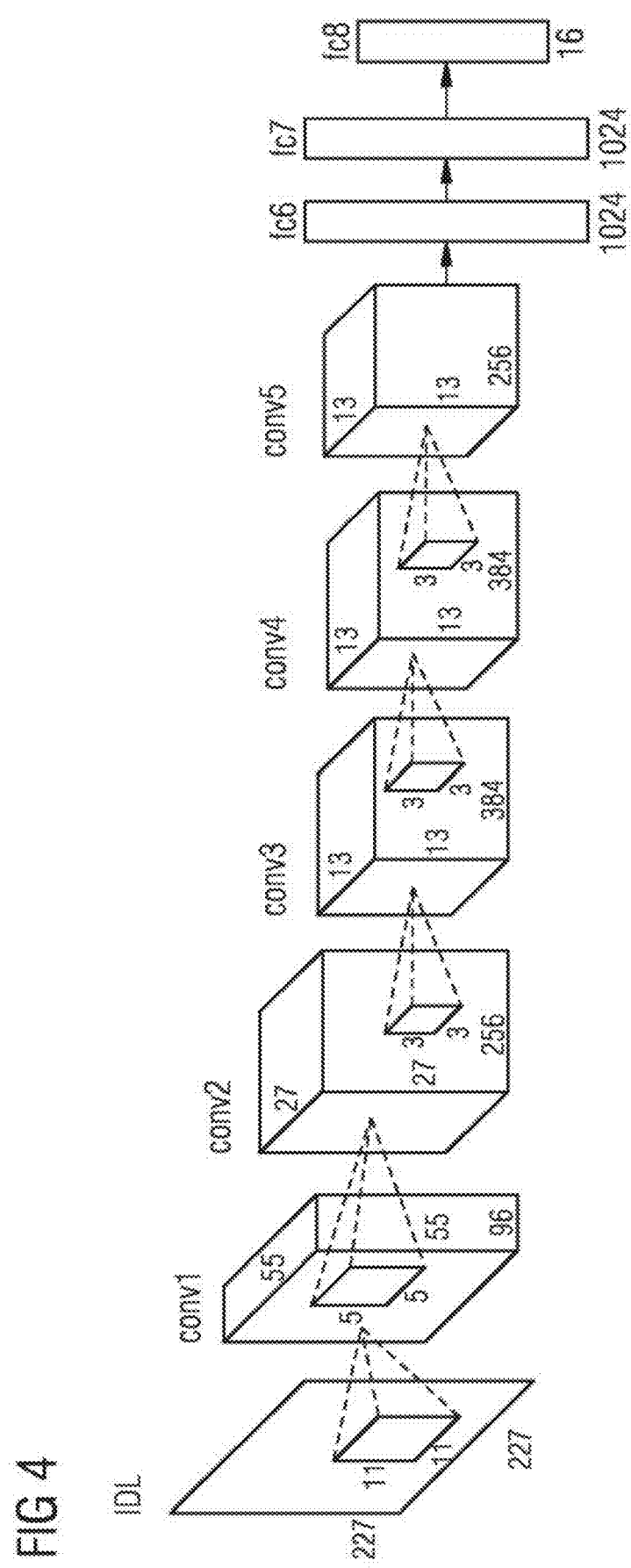

METHOD AND APPARATUS FOR DETECTING OBJECTS OF INTEREST IN IMAGES

The invention relates to a method and apparatus for detecting objects of interest in images and in particular to object detection using deep neural networks.

The detection of objects is a common concern in various use cases. In use cases like surveillance or driver assistance systems or autonomous driving or any other use cases where information about the environment is required, the detection of objects is an important task.

Accordingly, it is an object of the present invention to provide a method and apparatus for detecting objects of interest in images efficiently.

This object is achieved according to a first aspect of the present invention by a method for detecting objects of interest in images comprising the features of claim 1.

The invention provides according to the first aspect a method for detecting objects of interest in images,
wherein the method comprises the steps of:
supplying at least one input image to a trained deep neural network DNN which comprises a stack of layers, and using a deconvolved output of a learned filter or combining deconvolved outputs of learned filters of at least one layer of the trained deep neural network DNN to detect the objects of interest in the supplied images.

In a possible embodiment of the method according to the first aspect of the present invention, the deep neural network DNN is trained on annotated training images comprising annotation labels.

In a further possible embodiment of the method according to the first aspect of the present invention, the annotation labels of the annotated training images comprise count values indicating a number of objects of interest within the respective training image.

In a still further possible embodiment of the method according to the first aspect of the present invention, the deep neural network DNN is trained on the basis of annotated synthetic training images and/or annotated natural training images.

In a still further possible embodiment of the method according to the first aspect of the present invention, deconvolved outputs of learned filters of mid-level and high-level layers of the trained deep neural network DNN are combined to detect the objects of interest in the supplied images.

In a further possible embodiment of the method according to the first aspect of the present invention, the input images comprise pixels with pixel values for different channels.

In a further possible embodiment of the method according to the first aspect of the present invention, the channels comprise color channels including pixel values for different colors including a red color, a blue color and a green color.

In a further possible embodiment of the method according to the first aspect of the present invention, a noise within the at least one deconvolved output of at least one learned filter is reduced by processing the different channels separately.

In a further possible embodiment of the method according to the first aspect of the present invention, at least one channel is preserved while at least another channel is suppressed to reduce a noise within at least one deconvolved output of at least one learned filter.

In a still further possible embodiment of the method according to the first aspect of the present invention, selected channels are processed to increase a mean value of the respective channels.

In a further possible embodiment of the method according to the first aspect of the present invention, a background within the input image is eliminated at least partially by comparing the output of a learned filter of a layer with the deconvolved outputs of learned filters.

In a further possible embodiment of the method according to the first aspect of the present invention, a thresholding is performed for detecting contours of objects of interest within the supplied images.

In a further possible embodiment of the method according to the first aspect of the present invention, bounding boxes are superimposed on the input images around the detected contours to mark objects of interest within the input images.

In a further possible embodiment of the method according to the first aspect of the present invention, the input images with the superimposed bounding boxes are memorized, transmitted and/or displayed and/or wherein the bounding boxes are stored separately as meta data.

In a still further possible embodiment of the method according to the first aspect of the present invention, the objects of interest comprise mobile objects including pedestrians and/or vehicles and/or static objects.

In a still further possible embodiment of the method according to the first aspect of the present invention, the deep neural network DNN comprises a convolutional neural network CNN and/or a recurrent neural network RNN and/or a deep feed forward network.

The invention further provides according to a further aspect an apparatus for detection of objects of interest in images comprising the features of claim 15.

The invention provides according to the second aspect an apparatus for detection of objects of interest in images wherein the apparatus comprises:
a supply unit adapted to supply at least one input image to a trained deep neural network DNN which comprises a stack of layers; and
a processing unit adapted to combine deconvolved outputs of learned filters of at least one layer of the trained deep neural network DNN to detect objects of interest in the supplied input images.

In the following, possible embodiments of the different aspects of the present invention are described in more detail with reference to the enclosed figures.

FIG. 1 shows a block diagram of a possible exemplary embodiment of an apparatus for detection of objects of interest in images according to an aspect of the present invention;

FIG. 2 shows a flowchart of a possible exemplary embodiment of a method for detection of objects of interest in images according to a further aspect of the present invention;

FIG. 4 shows a schematic diagram for illustrating the operation of a method and apparatus for detecting objects of interest in images according to a possible embodiment.

Figure 3:
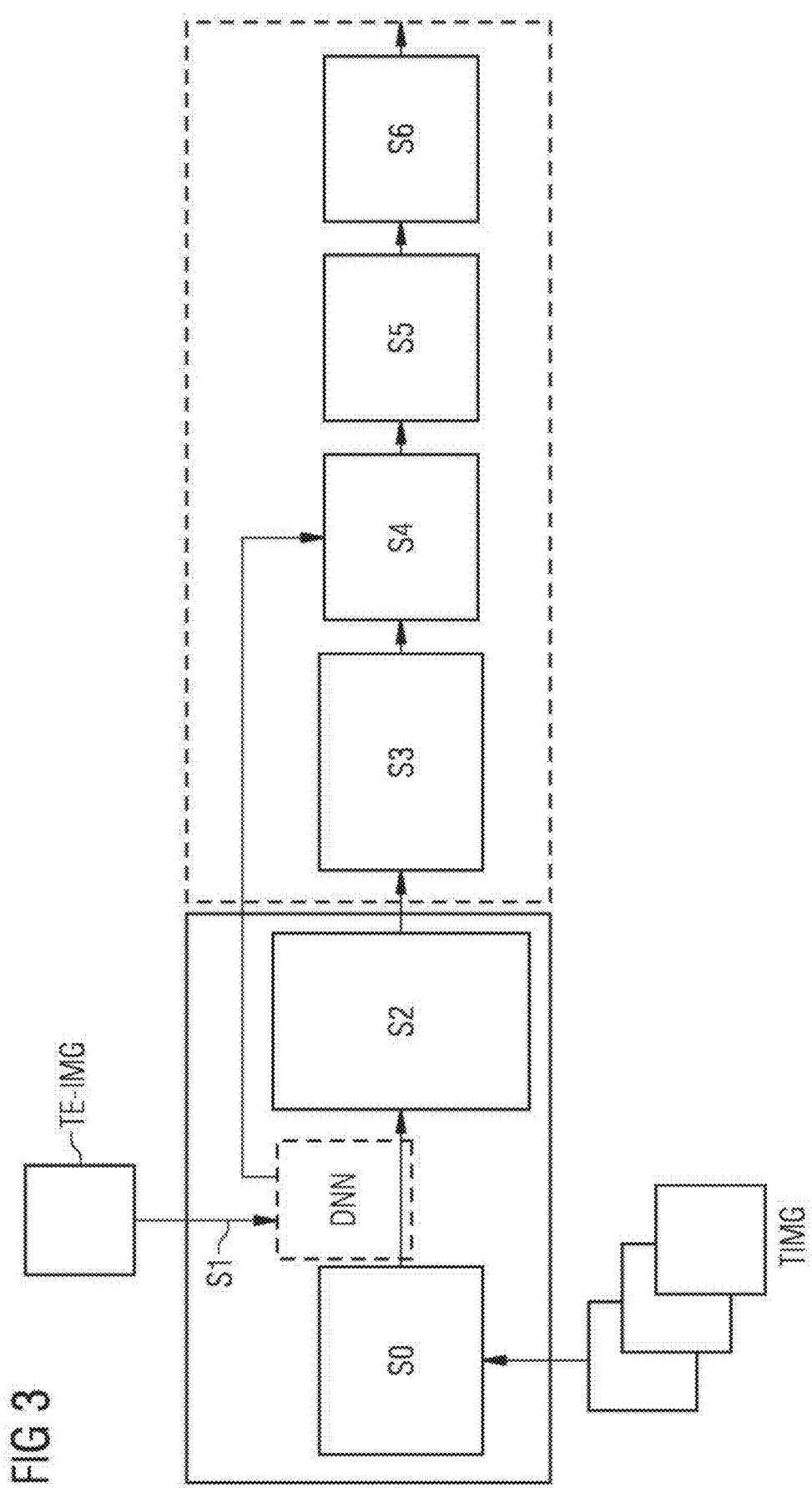
FIG. 3 shows a block diagram of a possible further exemplary embodiment of a detection apparatus according to the present invention.

As can be seen in FIG. 1, the detection apparatus 1 according to the present invention comprises in the illustrated embodiment a supply unit 2 and a processing unit 3. The supply unit 2 is adapted to supply at least one input image to a trained deep neural network DNN which comprises a stack of layers. The output of the supply unit 2 is connected to a processing unit 3 of the detection apparatus 1. In a possible embodiment the processing unit 3 is adapted to combine deconvolved outputs of learned filters of at least one layer of the trained deep neural network DNN to detect objects of interest in the input images supplied to the trained deep neural network by the supply unit 2. The processing unit 3 can also be adapted to use a deconvolved output of a learned filter of a layer of the DNN.

The images supplied to the trained deep neural network DNN can be captured in a possible embodiment by cameras. In an alternative embodiment, the input images supplied to the trained deep neural network DNN can be read from a memory or can be received from other devices of a system.

The detection apparatus 1 is provided for detecting objects of interest in received digital images. The objects of interest can comprise either mobile objects or static objects. The mobile objects can be for instance pedestrians and/or vehicles in the supplied digital images. Further, the objects can also comprise static objects within the supplied digital images such as trees or buildings.

The deep neural network DNN can be trained on annotated training images comprising annotation labels. In a possible embodiment, the annotation labels of the annotated training images can comprise count values indicating a number of objects of interest with the respective training image supplied to the deep neural network DNN to be trained. The deep neural network DNN can be trained on the basis of annotated synthetic training images and also on annotated natural training images.

The deep neural network DNN comprises a stack of layers. Deconvolved outputs of learned filters of mid-level and high-level layers of the trained deep neural network DNN are combined in a possible embodiment to detect the objects of interest in the supplied digital images.

In a possible embodiment, the input images supplied to the trained deep neural network DNN can comprise pixels wherein each pixel comprises pixel values. In a possible implementation, a pixel can comprise pixel values for different channels. In a possible embodiment, these channels comprise color channels including pixel values for different colors. In a possible implementation, the color channels can comprise pixel values for a red color channel, a blue color channel and a green color channel.

In a possible embodiment, a noise within the combined deconvolved outputs of the learned filters can be reduced by processing the different channels separately. In a possible embodiment, at least one channel such as a color channel is preserved while at least another channel such as another color channel can be suppressed to reduce a noise within the combined deconvolved outputs of the learned filters. The selected channels such as color channels can also be processed to increase a mean value of a respective channel.

In a possible embodiment of the detection apparatus 1, a background within the input image can be eliminated at least partially by comparing the output of a learned filter of a layer with the deconvolved output of a learned filter or a combination of the deconvolved outputs of learned filters of the deep neural network DNN. Then, a thresholding can be performed for detecting contours of objects of interest within the supplied digital images.

Further, the detection apparatus 1 can be adapted to superimpose bounding boxes on the input images around the detected contours to mark objects of interest within the input images. In a possible embodiment, the input images with the superimposed bounding boxes can be memorized as meta data in a data memory. Further, the bounding boxes corresponding to the input images can also be memorized, transmitted to other devices of the system and/or stored separately as meta data. Moreover, the input images with the superimposed bounding boxes can also be displayed on a screen to a user.

The deep neural network DNN employed by the detection apparatus 1 can comprise in a possible embodiment a convolutional neutral network CNN. In an alternative embodiment, the detection apparatus can also employ a recurrent neural network RNN. In a further alternative embodiment the deep neural network DNN can also comprise a deep fed forward network.

The employed deep neural network DNN is composed of several layers. Each layer can comprise several nodes where computation is performed. A node of the layer combines input from the data with a set of coefficients or weights that either amplify or dampen the output, thereby assigning significance to inputs for the task the algorithm is trying to learn. These products can be summed and the generated sum is passed through a node's so-called activation function to determine whether and to what extent said signal progresses further through the neural network NN to affect the ultimate output.

Accordingly, a layer of the employed deep neural network DNN can comprise a row of neuron-like switches that turn on and off as input data is fed through the deep neural network DNN. Each layer's output is simultaneously the subsequent layer's input starting from an initial input layer receiving the data. The deep neural network DNN comprises at least one input layer, at least one output layer and one or several hidden layers in-between the input layer and the output layer.

In deep learning neural networks, each layer of nodes trains on a distinct set of features based on the previous layer's output. The further one advances into the deep neural network DNN, the more complex the features become which the nodes can recognize because the nodes aggregate and recombine features from the previous layer. This is also known as feature hierarchy. The hierarchy is a hierarchy of increasing complexity and abstraction. A feature hierarchy makes deep learning neural networks capable of handling very large, high-dimensional datasets with a plurality of parameters that can pass through non-linear functions.

The deep learning neural network DNN trained on labelled data can after training be applied to unstructured data comprising the digital input image data.

In a possible embodiment, the deep neural network DNN is formed by a convolutional neural network CNN. The convolutional neural network CNN is a type of feed forward artificial neural network. A convolutional layer forms a core building block of a convolutional neural network CNN. The layers' parameters consist of a set of learnable filters or kernels which have a small receptive field but extend through the full depth of the input data volume. During the forward pass, each filter is convolved across the width and height of the input volume, computing a dot product between the entries of the filter and the input and producing a two-dimensional activation map of the filter. As a result, the network learns filters that can be activated and it detects some specific type of feature at some spatial position in the input data. A possible structure of the convolutional neural network CNN is also illustrated in context with FIG. 4.

In a possible embodiment, the deep neural network DNN for counting objects can be used by the detection apparatus 1. The deconvolved outputs of learned filters of the trained deep neural network DNN are then used for detection of objects of interest. The objects of interest can for example comprise foreground objects of a specific type such as pedestrians or vehicles. In a possible embodiment, to achieve detection of the foreground objects of a specific type a deep neural network DNN used for counting objects can be trained. The filters learned by the different layers of the deep neural network DNN are then used to analyze an input image for detecting objects of interest such as foreground objects. Though the deep neural network DNN has not been explicitly trained for detecting objects, in order to achieve the task of counting objects, it learns filters that are activated by the foreground objects. This fact can be exploited to achieve the detection of the objects. In order to extract the parts of the input image causing activations in the filters of the deep neural network DNN, deconvolution is used in which successive unpooling, rectification and filtering can be performed to reconstruct the activity in the layer beneath that layer which gave rise to the chosen activation.

Lower layers of the deep neural network DNN in general represent low-level features. Using these does require additional intelligence to separate the foreground from the background. With an increasing hierarchy of the layers, higher level concepts are learned until the highest layer of the deep neural network DNN is reached. The highest layer of the deep neural network DNN is most task-specific. A combination of channels from mid-level layers and higher-level layers can be used in a possible embodiment to detect foreground objects in the supplied digital images. Different channels of the mid-level layers and/or high level layers can be activated by different parts of the foreground objects. By combining or merging the deconvolved outputs of the learned filters, it is possible to obtain an indication of specific objects of interest such as foreground objects.

FIG. 2 shows a flowchart of a possible exemplary embodiment of a method for detecting objects of interest in images according to an aspect of the present invention. The method comprises in the illustrated exemplary embodiment two main steps.

In a first step S1, at least one input image is supplied to a trained deep neural network DNN which comprises a stack of layers.

In a further step S2, the deconvolved output of a learned filter is used or the deconvolved outputs of learned filters of at least one layer of the trained deep neural network DNN are combined in step S2 to detect the object of interest in the supplied images.

Before supplying the input images to the deep neural network DNN, the deep neural network DNN is trained in a training phase. The deep neural network DNN can be trained in a possible embodiment on annotated training images comprising annotation labels. These annotation labels can include count values indicating a number of objects of interest within each of the supplied training image. The training of the deep neural network DNN can be performed on the basis of annotated synthetic training images and/or annotated natural training images.

In a possible embodiment, the deconvolved outputs of learned filters of mid-level and high-level layers of the trained deep neural network DNN are combined in step S2 to detect the objects of interest in the supplied digital images.

The supplied digital images can comprise pixels with pixel values for different channels, in particular color channels including pixel values for different colors including a red color, a green color, and a blue color.

FIG. 3 shows a schematic diagram for illustrating a possible embodiment of a method for detecting objects of interest in images. The illustrated embodiment can for instance be used for detecting pedestrians as foreground objects in supplied digital images. As can be seen in the embodiment of FIG. 3, in initial step S0, a provided deep neural network DNN is trained using training images TIMG supplied to the deep neural network DNN. The used deep neural network DNN can be for instance a deep neural network DNN for counting objects. Further, at least one image such as a test image TE-TMG can be supplied to the trained deep neural network DNN in step S1 as illustrated also in FIG. 3. In a possible embodiment, the sequence of input images comprising a plurality of input images or input image frames can be supplied to the trained deep neural network DNN. In a further step S2, the deconvolved outputs of learned filters of at least one layer of the trained deep neural network DNN are combined to detect the object of interest in the supplied images. In a possible embodiment, deconvolved outputs of learned filters of the trained deep neural network DNN or data model are merged for detection in step S2.

The processing can be extended as illustrated in FIG. 3. In a further step S3, a low-level processing noise reduction and a pseudo-coloring can be performed. The noise of the combined deconvolved outputs of the learned filters can be reduced by processing different channels separately. It is possible that at least one channel is preserved while at least another channel is suppressed to reduce a noise within the combined deconvolved outputs of the learned filters. In a possible embodiment, a noise reduction can be achieved on the composite image by using techniques where different color channels are treated separately. In a possible implementation, the details of red color channels and blue color channels are preserved while suppressing the details of a green color channel since the foreground objects are highlighted in color tones with high values of the red and blue channels. This is because the deconvolution results in features of the input image causing activations to be highlighted in colors dominated by red and blue.

The dominant color channels, i.e. the red color channel and the blue color channel, can be the same for all kinds of image date since a heatmap generated after deconvolution for any image would result in the features of the input image causing activations to be highlighted in these colors. However, if the process of plotting the heatmap is changed, then the representation can change and the processing can be adapted accordingly. The noise reduction is followed in step S3 by performing a so-called pseudo-coloring. In a possible embodiment, color variations are produced based on sine wave generation for each of the color channels. In a possible implementation, the mean value of the red color channel and the blue color channel are increased to bring out the foreground objects more clearly. Accordingly, selected channels can be processed in a possible embodiment to increase a mean value of the respective channel.

In a further processing step, a background elimination can be performed. In this step S4, a background within the input image is eliminated at least partially by comparing the output of a learned filter of a layer with the deconvolved output of a learned filter or a combination of the deconvolved outputs of learned filters For instance, the output from a channel of the convolutional layer 5 of the deep neural network DNN can be used to remove parts of the background.

With the increasing hierarchy of the layers of the deep neural network DNN, the filters learn better the concept of the foreground. In a possible embodiment, filters in the convolutional layer 5 can comprise an output that is able to localize the foreground well while being able to distinguish it from large parts of the background. It is possible to obtain information about the separation from the foreground and background of the image frame at a global level. By comparing the channel output of a specific layer such as the fifth convolutional layer of the DNN with the output obtained after low-level processing (noise removal and pseudo-coloring), parts of the background are eliminated. The employed concept is similar to said of guided filtering where the content of a guide image is used to filter the actual image. Likewise, in this case, the filter output of the specific convolutional layer, such as the fifth convolutional layer of the DNN can serve as the guide image. For regions with low or zero pixel values in the guide image, the output of the image being filtered can be discarded or considered part of the background while the rest is considered as foreground. $p(x,y)$ denotes the pseudo-colored output where p is the pixel value at coordinates x, y in the digital image. $g(x,y)$ denotes the guide image (for example, the output of a filter or channel of a specific convolutional layer such as the fifth convolutional layer where g is the pixel value at co-ordinates x, y of the digital image. In a possible embodiment, $p(x,y)$ is used as a first input and $g(x,y)$, e.g. the guide image, is used as a second input for step S4. The output of step S4 can be denoted by $f(x,y)$ where f is the pixel value at co-ordinates x, y in the digital image, wherein $f(x,y)$=the background, if $g(x,y) \leq$ a threshold value and $f(x,y)=p(x,y)$, if $g(x,y)>$the threshold value.

The background elimination in step S4 is followed in the illustrated embodiment of FIG. 3 by a thresholding step S5. The thresholding is performed to detect contours of objects of interest within the supplied images. If the input of the thresholding step is denoted by $f(x,y)$ wherein f is the pixel value at co-ordinates x, y in the digital image and $o(x,y)$ is the output of the thresholding step wherein o is the pixel value at co-ordinates x, y, in the digital image:

$o(x,y)$=foreground if $f(x,y) \leq$ a threshold value and $o(x,y)$=background if $f(x,y)>$the threshold value.

A contour detection in step S5 is followed by bounding the contour results in bounding boxes. The bounding is performed in step S6 as illustrated in FIG. 3. In step S6, the bounding boxes are generated at the detected contours of the objects of interest within the supplied images. The bounding boxes can be superimposed on the input image around the detected contours to mark objects of interest within the input images. The input images with the superimposed bounding boxes can be output as illustrated in FIG. 3. The input images with the superimposed bounding boxes can be stored in a memory or transmitted to another device or displayed on a screen to a user.

FIG. 3 shows a possible embodiment with an extended postprocessing. This postprocessing includes low-level processing including noise reduction and pseudo-coloring (step S3) to highlight a foreground region. By using channels from a mid-level layer of the deep neural network DNN, there are also some parts of the background that can cause activations that need to be eliminated. The background elimination is performed in step S4. By using some of the filters learned by the higher layers, parts of the background can be eliminated in step S4. This is followed by thresholding in step S5 to segment the foreground region. Finally, the segmented foreground is analyzed for closed contours and can be enclosed by generated bounding boxes in step S6.

The used deep neural network DNN is trained by using training images TIMG as illustrated in FIG. 3. The deep neural network DNN for counting objects can be trained using synthetic images and/or natural images. A model can be tuned for the target dataset using few digital images. This avoids the need for large annotated training data from the target site during training.

Transfer learning can be used to train a convolutional neural network CNN for counting pedestrians using synthetic images from a baseline network trained for image classification. There is also the possibility of using natural images or a combination of synthetic images and natural images to train and tune the deep neural network DNN.

FIG. 4 shows the structure of a deep neural network DNN which can be used for pedestrian counting. The deep neural network DNN comprises an input data layer IDL as illustrated in FIG. 4. Further, the deep neural network DNN comprises several convolutional layers conv1 to conv5 as shown in FIG. 4. The convolutional layers can be followed by fully connected layers fc6, fc7, fc8 as shown in FIG. 4. In the illustrated embodiment, the numbering of the layers is in increasing order of hierarchy with layer 1 being the lowest layer and layer 8 indicating the highest layer within the hierarchy. The illustrated blocks and corresponding numbers denote possible dimensions of the volume of neurons or nodes in each layer of the deep neural network DNN. For the five convolutional layers conv1 to conv5, a kernel size is also illustrated. For instance, the first convolutional layer 1 of the deep neural network DNN has volume dimensions 55×55×96. The kernel of the first convolutional layer has a kernel size 5×5. The dimension of the second convolutional layer 2 is 27×27×256 including a kernel with a kernel size of 3×3 as shown in FIG. 4. The next convolutional layer conv3 has the dimensions 13×13×384 and a kernel with a kernel size 3×3. The fourth convolutional layer conv4 comprises dimensions 13×13×384 with a kernel size 3×3. The last convolutional layer conv5 comprises dimensions 13×13×256 indicating the volume of neurons or nodes in this layer. The input data layer IDL on the left side of FIG. 4 comprises a data layer which is fed to the deep neural network DNN. A convolutional deep neural network CNN can comprise as illustrated in FIG. 4 five convolutional layers and three fully connected layers fc6, fc7, fc8. The final fully connected layer fc8 forms a classifier that gives a probability for each class. Rectified linear units can be used for the activation functions. Pooling and local response normalization layers can be present at the convolutional layers. A dropout can be used to reduce overfitting.

A forward pass through the deep neural network DNN comprises a data flowing from the input data layer IDL to the output layer, i.e. from the layers lower in the hierarchy to the layers higher in the hierarchy. A deconvolution pass involves starting from one of the learned filters at a layer and doing the reverse process of successive unpooling, rectification and filtering to reconstruct the activity in the layer beneath that which gives rise to the chosen activation. This flow is from the layers higher in the hierarchy to the layers lower in the hierarchy.

In a different embodiment, the number and dimensions of convolutional layers and fully connected layers can vary depending on the use case. The apparatus for detecting objects of interest in digital images can be used for different use cases including driver assistance systems or surveillance systems. The method for detecting objects of interest in images can be performed in parallel for detecting different kind of objects of interest in images simultaneously. The images are in a preferred embodiment digital colored images which may be captured by cameras of a vehicle. The images captured by the cameras can be supplied to a trained deep neural network DNN as illustrated in the exemplary embodiment of FIG. 4. The deconvolved outputs of learned filters of at least one layer of the trained deep neural network DNN are combined and processed by a processing unit to detect objects of interest in the supplied input images. These objects can for instance comprise pedestrians in the surrounding of the vehicle or other vehicles in the surrounding of the vehicle. The image can undergo a postprocessing as illustrated in FIG. 3 to provide bounding boxes or other symbols to mark objects of interest within the supplied input image. The detected objects of interest such as pedestrians and/or vehicles can be displayed with different symbols or bounding boxes on a screen to a user, for instance to a driver of a vehicle. In a possible embodiment, the employed deep neural network DNN or data model can be loaded from a database for different use cases or operation modes of the system.

The invention claimed is:

1. A method for detecting objects of interest in images, the method comprising:
supplying at least one input image to a trained deep neural network, which comprises a stack of layers; and
using a deconvolved output of a learned filter or combining deconvolved outputs of learned filters of at least one layer of the trained deep neural network to detect the objects of interest in the supplied at least one input image,
wherein the deep neural network is trained on annotated training images comprising annotation labels, and
wherein the annotation labels of the annotated training images comprise count values indicating a number of objects of interest within the respective training image.

2. The method of claim 1, wherein the deep neural network is trained based on annotated synthetic training images.

3. The method of claim 1, wherein the deep neural network is trained based on annotated natural training images.

4. The method of claim 1, wherein deconvolved outputs of learned filters of mid-level and/or high-level layers of the trained deep neural network are combined to detect the objects of interest in the supplied at least one input image.

5. The method of claim 1, wherein the at least one input image comprises pixels with pixel values for different channels.

6. The method of claim 5, wherein the different channels comprise color channels including pixel values for different colors including a red color, a blue color, and a green color.

7. The method of claim 6, wherein a noise within at least one deconvolved output of at least one learned filter or the at least one combined deconvolved output of the learned filters is reduced by processing the different channels separately.

8. The method of claim 5, wherein at least one channel of the different channels is preserved while at least another channel of the different channels is suppressed to reduce a noise within at least one deconvolved output of at least one learned filter or the at least one combined deconvolved output of the learned filters.

9. The method of claim 1, wherein the objects of interest comprise mobile objects including pedestrians and/or vehicles.

10. The method of claim 1, wherein the objects of interest comprise static objects.

11. The method of claim 1, wherein the deep neural network comprises a convolutional neural network, a deep feed forward network, or a combination thereof.

12. An apparatus for detection of objects of interest in images, the apparatus comprising:
a supply unit configured to supply at least one input image to a trained deep neural network, the trained deep neural network comprising a stack of layers; and
a processing unit configured to combine deconvolved outputs of learned filters of at least one layer of the trained deep neural network or to use a deconvolved output of a learned filter of at least one layer of the trained deep neural network to detect objects of interest in the supplied at least one input image,
wherein the deep neural network is trained on annotated training images comprising annotation labels, and
wherein the annotation labels of the annotated training images comprise count values indicating a number of objects of interest within the respective training image.

13. The method of claim 2, wherein the deep neural network is further trained based on annotated natural training images.

14. The method of claim 2, wherein deconvolved outputs of learned filters of mid-level and/or high-level layers of the trained deep neural network are combined to detect the objects of interest in the supplied at least one input image.

15. The method of claim 2, wherein the at least one input image comprises pixels with pixel values for different channels.

16. The method of claim 3, wherein deconvolved outputs of learned filters of mid-level and/or high-level layers of the trained deep neural network are combined to detect the objects of interest in the supplied at least one input image.

17. The method of claim 3, wherein the at least one input image comprises pixels with pixel values for different channels.

18. The method of claim 6, wherein at least one channel of the different channels is preserved while at least another channel of the different channels is suppressed to reduce a noise within at least one deconvolved output of at least one learned filter or the at least one combined deconvolved output of the learned filters.

19. The method of claim 7, wherein at least one channel of the different channels is preserved while at least another channel of the different channels is suppressed to reduce a noise within at least one deconvolved output of at least one learned filter or the at least one combined deconvolved output of the learned filters.

20. The method of claim 9, wherein the objects of interest further comprise static objects.

* * * * *